US012572346B2

(12) United States Patent
Ishikawa et al.

(10) Patent No.: US 12,572,346 B2
(45) Date of Patent: Mar. 10, 2026

(54) OTA MASTER, METHOD, AND NON-TRANSITORY STORAGE MEDIUM

(71) Applicant: TOYOTA JIDOSHA KABUSHIKI KAISHA, Toyota (JP)

(72) Inventors: Tomoyasu Ishikawa, Nagoya (JP); Shunsuke Tanimori, Toyota (JP); Nana Kikuire, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 21 days.

(21) Appl. No.: 17/658,267

(22) Filed: Apr. 7, 2022

(65) Prior Publication Data

US 2022/0342652 A1 Oct. 27, 2022

(30) Foreign Application Priority Data

Apr. 26, 2021 (JP) ................................. 2021-074037

(51) Int. Cl.
| | |
|---|---|
| *G06F 8/65* | (2018.01) |
| *G06F 8/60* | (2018.01) |
| *G07C 5/00* | (2006.01) |
| *H04L 12/40* | (2006.01) |

(52) U.S. Cl.
CPC .................. *G06F 8/65* (2013.01); *G06F 8/60* (2013.01); *G07C 5/008* (2013.01); *H04L 12/40* (2013.01); *H04L 2012/40273* (2013.01)

(58) Field of Classification Search
None
See application file for complete search history.

(56) References Cited

U.S. PATENT DOCUMENTS

| | | | | |
|---|---|---|---|---|
| 11,914,987 | B2 * | 2/2024 | Acharya | H04L 67/34 |
| 11,968,292 | B1 * | 4/2024 | Char | H04L 9/0637 |
| 2003/0140226 | A1 * | 7/2003 | Yamamoto | H04W 12/06 |
| | | | | 713/156 |
| 2003/0202663 | A1 * | 10/2003 | Hollis | H04L 63/166 |
| | | | | 380/282 |
| 2004/0205179 | A1 * | 10/2004 | Hunt | G06F 11/3684 |
| | | | | 709/223 |
| 2017/0134164 | A1 * | 5/2017 | Haga | G06F 8/654 |
| 2017/0288976 | A1 * | 10/2017 | Wang | H04L 41/12 |
| 2018/0217828 | A1 * | 8/2018 | Madrid | H04L 63/123 |
| 2020/0252207 | A1 * | 8/2020 | Hanel | H04L 9/083 |
| 2020/0371600 | A1 * | 11/2020 | Tellier | G06F 8/65 |
| 2021/0157570 | A1 * | 5/2021 | Harata | G06F 8/654 |
| 2021/0203682 | A1 * | 7/2021 | Bajpai | H04L 63/0428 |
| 2023/0336994 | A1 * | 10/2023 | Gan | H04W 12/08 |

FOREIGN PATENT DOCUMENTS

| | | |
|---|---|---|
| JP | 2004-326689 A | 11/2004 |
| JP | 2012-053868 A | 3/2012 |
| JP | 2019-105946 A | 6/2019 |
| WO | 2018/070242 A1 | 4/2018 |

* cited by examiner

*Primary Examiner* — Jason D Mitchell
(74) *Attorney, Agent, or Firm* — Oblon, McClelland, Maier & Neustadt, L.L.P.

(57) ABSTRACT

An OTA master configured to control a software update on an ECU mounted on a vehicle includes one or more processors. The one or more processors are configured to: download update data of software on the ECU from an OTA center; control the software update on the ECU using the update data; and when the update data has been encrypted and a decryption process is necessary but the decryption process fails, send a notification indicating that the decryption process fails to the OTA center.

4 Claims, 4 Drawing Sheets

1

OTA MASTER, METHOD, AND NON-TRANSITORY STORAGE MEDIUM

CROSS-REFERENCE TO RELATED APPLICATION

This application claims priority to Japanese Patent Application No. 2021-074037 filed on Apr. 26, 2021, incorporated herein by reference in its entirety.

BACKGROUND

1. Technical Field

The present disclosure relates to OTA masters, methods, and non-transitory storage media for controlling software updates on electronic control units (ECUs).

2. Description of Related Art

A vehicle is equipped with a plurality of electronic control units (ECUs) that controls operation of the vehicle. Each ECU includes a processor, a temporary storage unit such as a random access memory (RAM), and a nonvolatile storage unit such as a flash read only memory (ROM). Control functions of each ECU are implemented by the processor executing software stored in the nonvolatile storage unit. The software stored in each ECU is rewritable, and it is possible to improve the functions of each ECU or add a new vehicle control function to each ECU by updating the software to a newer version.

An over-the-air (OTA) technique is known as a technique for updating software on an ECU. In the OTA technique, a program on the ECU is updated or a program on the ECU is added by wirelessly connecting an in-vehicle communication device connected to an in-vehicle network to a communication network such as the Internet, downloading software (update data) from an OTA center via wireless communication, and installing the downloaded software (see, e.g., Japanese Unexamined Patent Application Publication No. 2004-326689 (JP 2004-326689 A)).

The update data that is sent from the OTA center to the vehicle has been encrypted, and the vehicle decrypts the update data to update the program (software) on the ECU.

SUMMARY

There are cases where the vehicle cannot decrypt the update data received from the OTA center. Examples of such cases include: when the ECU of the vehicle no longer has a decryption function due to replacement of the ECU, when the version of the software on the ECU has changed inappropriately (when the software on the ECU is not compatible with the encryption method of the update data), when the encrypted update data has been corrupted, and when the update data has been tampered. In such cases, appropriate measures need to be taken as the vehicle cannot decrypt the update data received from the OTA center.

The present disclosure provides an OTA master, a method, and a non-transitory storage medium that can take appropriate measures when a vehicle cannot decrypt update data received from an OTA center.

An OTA master according to the present disclosure is configured to control a software update on an ECU mounted on a vehicle. The OTA master includes one or more processors. The one or more processors are configured to download update data of software on the ECU from an OTA center. The one or more processors are configured to control the software update on the ECU using the update data. The one or more processors are configured to, when the update data has been encrypted and a decryption process is necessary but the decryption process fails, send a notification indicating that the decryption process fails, to the OTA center.

In the OTA master according to the present disclosure, the one or more processors may be configured to perform the decryption process when the update data has been encrypted and the update data needs to be performed the decryption process by the OTA master. The one or more processors may be configured to, when the decryption process fails, send a notification indicating that the decryption process by the OTA master fails, to the OTA center.

In the OTA master according to the present disclosure, the one or more processors may be configured to send the update data to the ECU to cause the ECU to perform the decryption process, when the update data has been encrypted and the update data needs to be performed the decryption process by the ECU. The one or more processors may be configured to, when the one or more processors receives, from the ECU, information indicating that the decryption process has failed, send a notification indicating that the decryption process by the ECU has failed to the OTA center.

In the OTA master according to the present disclosure, the one or more processors may be configured to, when the decryption process fails, send a notification including information indicating a reason why the decryption process fails to the OTA center.

In the OTA master according to the present disclosure, the one or more processors may be configured to send a predetermined notification to a user when the decryption process fails.

A method according to the present disclosure is performed by a computer of an OTA master configured to control a software update on an ECU mounted on a vehicle. The computer includes one or more processors and a memory. The method includes: downloading update data of software on the ECU from an OTA center; controlling the software update on the ECU using the update data; and when the update data has been encrypted and a decryption process is necessary but the decryption process fails, sending a notification indicating that the decryption process fails to the OTA center.

A non-transitory storage medium according to the present disclosure stores instructions that are executable by a computer of an OTA master configured to control a software update on an ECU mounted on a vehicle, and that cause the computer to perform functions. The OTA master includes one or more processors and a memory. The functions include: downloading update data of software on the ECU from an OTA center; controlling the software update on the ECU using the update data; and when the update data has been encrypted and a decryption process is necessary but the decryption process fails, sending a notification indicating that the decryption process fails to the OTA center.

With the present disclosure, an OTA master, a method, and a non-transitory storage medium are provided that can take appropriate measures when a vehicle cannot decrypt update data received from an OTA center.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Embodiment

Figure 1:
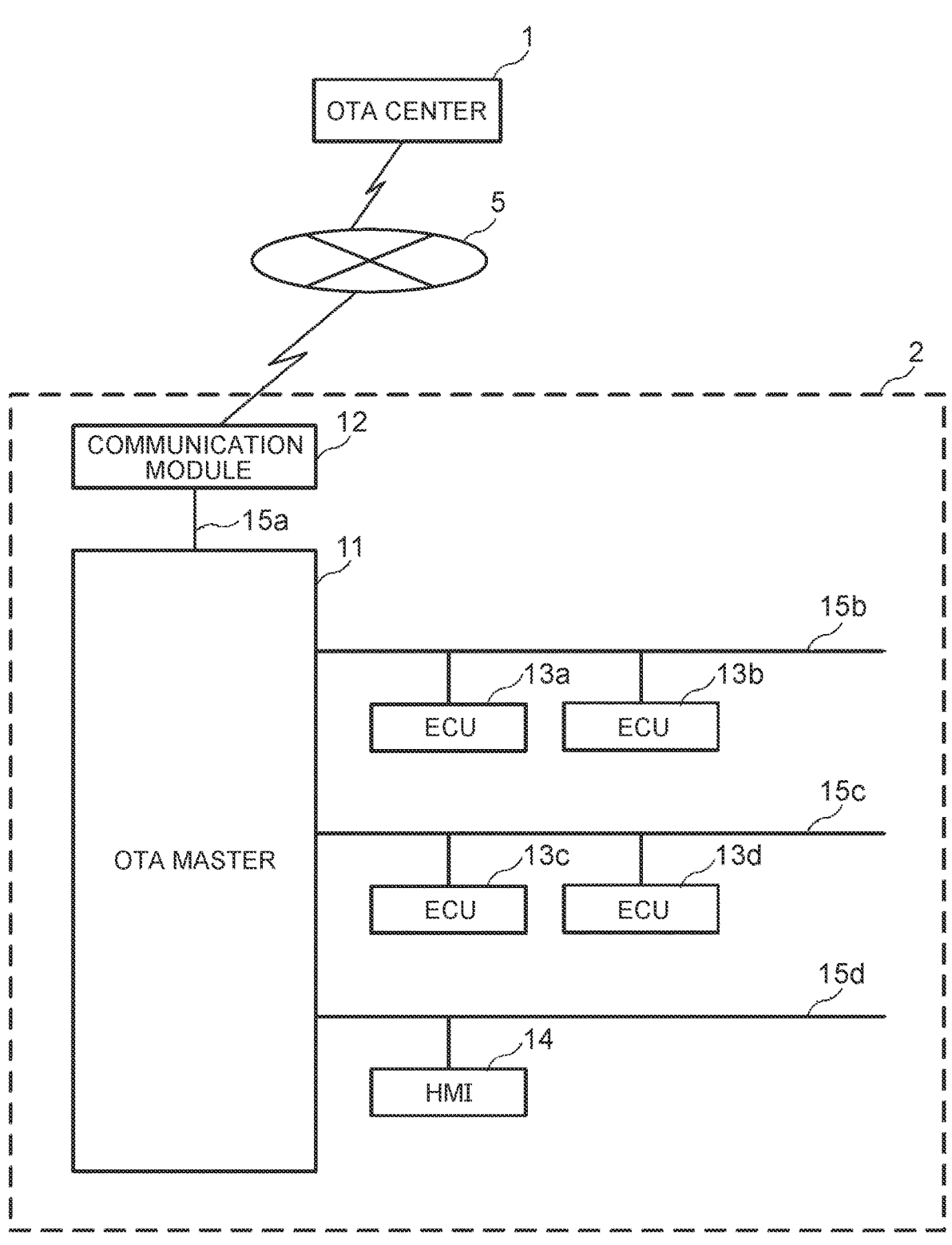
FIG. 1 is a block diagram showing an example of an overall configuration of a network system according to an embodiment.
Figure 2:
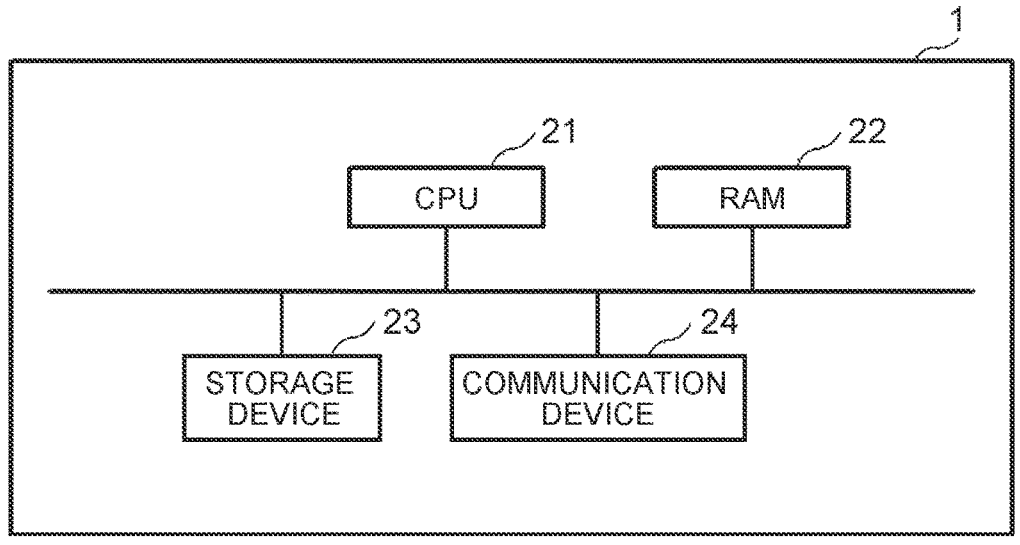
FIG. 2 is a block diagram showing an example of a schematic configuration of an OTA center shown in FIG. 1.
Figure 3:
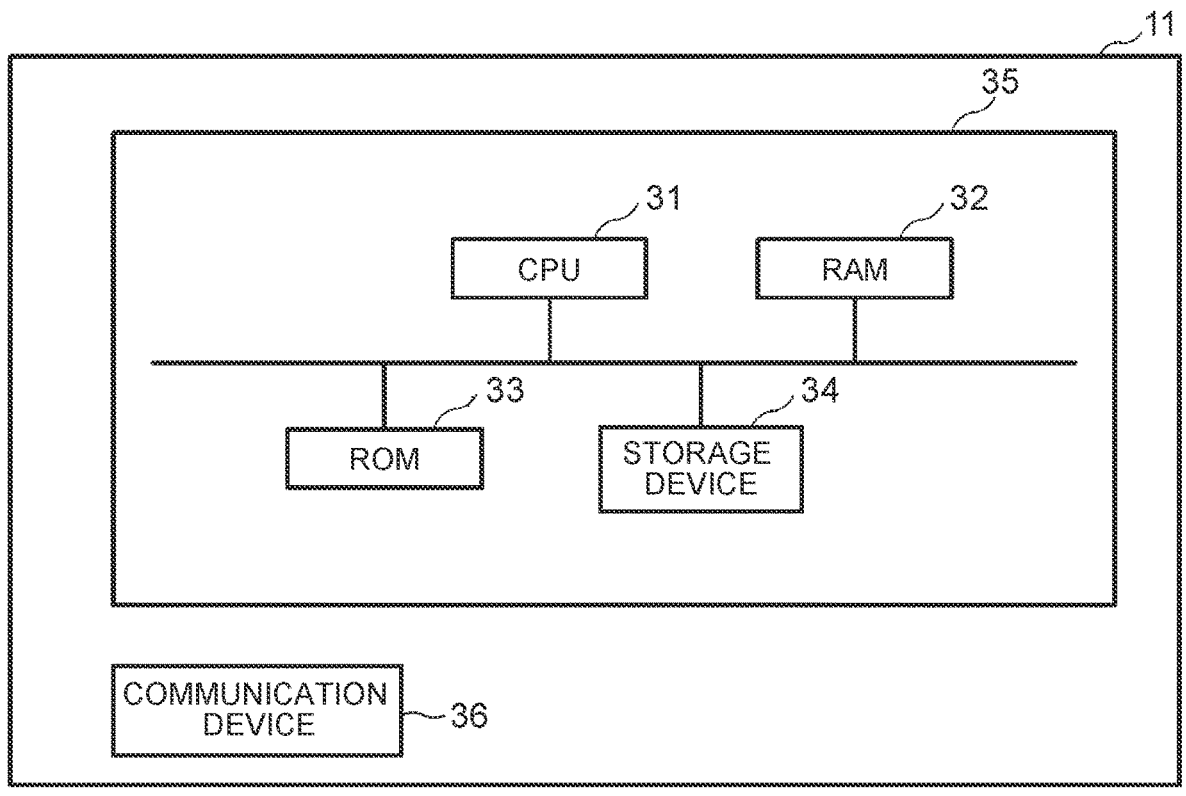
FIG. 3 is a block diagram showing an example of a schematic configuration of an OTA master shown in FIG. 1.

FIG. 1 is a block diagram showing an example of an overall configuration of a network system according to an embodiment. FIG. 2 is a block diagram showing an example of a schematic configuration of an OTA center shown in FIG. 1. FIG. 3 is a block diagram showing an example of a schematic configuration of an OTA master shown in FIG. 1.

A network system shown in FIG. 1 is a system for updating software on electronic control units (ECUs) 13a to 13d mounted on a vehicle, and includes an OTA center 1, an in-vehicle network 2 installed in the vehicle, and a communication network 5.

The OTA center 1 can communicate wirelessly with an OTA master 11 mounted on the vehicle via the communication network 5 such as the Internet. The OTA center 1 manages software updates on the ECUs 13a to 13d mounted on the vehicle.

As shown in FIG. 2, the OTA center 1 includes a central processing unit (CPU) 21, a RAM 22, a storage device 23, and a communication device 24. The storage device 23 includes a readable and writable storage medium such as a hard disk drive (HDD) or a solid state drive (SSD). For example, the storage device 23 stores a program for performing software update management, information used for the software update management, and update data for the ECUs. The CPU 21 performs a control process by executing the program read from the storage device 23 by using the RAM 22 as a work area. The communication device 24 communicates with the OTA master 11 via the communication network 5.

As shown in FIG. 1, the in-vehicle network 2 includes the OTA master 11, a communication module 12, the ECUs 13a to 13d, and a human machine interface (HMI; e.g., a display device of a car navigation system on which an input operation can be performed) 14. The OTA master 11 is connected to the communication module 12 via a bus 15a. The OTA master 11 is connected to the ECUs 13a, 13b via a bus 15b. The OTA master 11 is connected to the ECUs 13c, 13d via a bus 15c. The OTA master 11 is connected to the HMI 14 via a bus 15d. The OTA master 11 can wirelessly communicate with the OTA center 1 via the communication module 12. The OTA master 11 controls software updates on the ECU whose software (sometimes referred to as "SW") is to be updated (sometimes referred to as the "target ECU") out of the ECUs 13a to 13d, based on update data acquired from the OTA center 1. The communication module 12 is a communication device that connects the in-vehicle network 2 and the OTA center 1. The ECUs 13a to 13d control the operation of various parts of the vehicle. The HMI 14 is used to display various indications, such as an indication that there is update data, an accept request screen that requests a user or an administrator to accept a software update, and an update result, during a software update process for the ECUs 13a to 13d. Although the four ECUs 13a to 13d are illustrated in FIG. 1, the number of ECUs is not limited. The one or more target ECUs 13a to 13d may function as the OTA master 11.

As shown in FIG. 3, the OTA master 11 includes a microcomputer 35 and a communication device 36. The microcomputer 35 includes a CPU 31, a RANI 32, a ROM 33, and a storage device 34. The CPU 31 performs a control process by executing a program read from the ROM 33 by using the RAM 32 as a work area. The communication device 36 communicates with the communication module 12, the ECUs 13a to 13d, and the HMI 14 via the buses 15a to 15d shown in FIG. 1.

Figure 4:
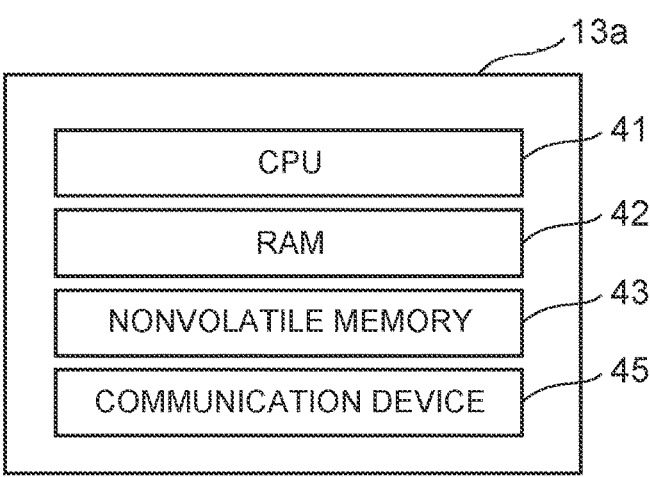
FIG. 4 is a block diagram showing an example of a schematic configuration of an ECU shown in FIG. 1.

Of the ECUs 13a to 13d, the ECU 13a will be described. As shown in FIG. 4, the ECU 13a includes a CPU 41, a RAM 42, a nonvolatile memory 43, and a communication device 45. The CPU 41 implements functions of the ECU 13a by executing a program read from the nonvolatile memory 43 by using the RAM 42 as a work area, or communicating with other devices by using the communication device 45. The ECUs 13b to 13d may have a configuration similar to that of the ECU 13a.

The software update process includes a download phase, an installation phase, and an activation phase. In the download phase, update data is downloaded from the OTA center 1 to the OTA master 11. In the installation phase, the OTA master 11 transfers the downloaded update data to the target ECU and installs the update data (the update software) in a storage area of the target ECU. In the activation phase, the target ECU activates the installed updated version of software.

Download is a process of receiving update data sent from the OTA center 1 and storing the received update data in the storage device 34. The update data is data for updating software on the ECU. The download phase includes control of a series of processes related to download, such as determination as to whether download can be performed and verification of update data, in addition to reception of the update data. Installation is a process of writing an updated version of a program (update software) in the nonvolatile memory of the target ECU based on the downloaded update data. The installation phase includes control of a series of processes related to installation, such as determination as to whether installation can be executed, transfer of update data, and verification of an updated version of a program, in addition to execution of installation. Activation is a process of activating (enabling) the installed updated version of the program. The activation phase includes a series of control related to activation, such as determination as to whether activation can be executed and verification of execution results, in addition to execution of activation.

The update data that is sent from the OTA center 1 to the OTA master 11 may include any of the following data: update software for the ECU, compressed data of the update software, and divided data of the update software or the compressed data. The update data may include an identifier that identifies the target ECU (ECU ID) and an identifier that identifies the software before update (ECU software ID).

The update data is downloaded as a distribution package. The distribution package includes update data for one or more ECUs.

When the update data includes update software, the OTA master 11 transfers the update data (i.e., the update software) to the target ECU in the installation phase. When the update data includes compressed data, difference data, or divided data of the update software, the OTA master 11 may transfer the update data to the target ECU, and the target ECU may generate the update software from the update data. Alternatively, the OTA master 11 may generate the update software from the update data and then transfer the update software to the target ECU. The update software can be generated by decompressing the compressed data or assembling the difference data or the divided data.

Installation of the update software can be executed by the target ECU based on an installation request from the OTA master 11. Alternatively, the target ECU that has received the update data or the update software may autonomously install the update software without receiving any explicit instruction from the OTA master 11.

Activation of the update software can be executed by the target ECU based on an activation request from the OTA master 11. Alternatively, the target ECU that has received the update data or the update software may autonomously activate the update software without receiving any explicit instruction from the OTA master 11.

Figure 5:
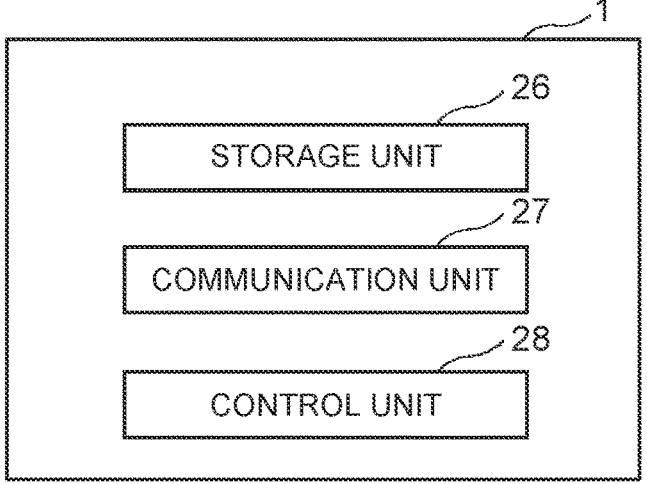
FIG. 5 is a functional block diagram showing an example of the OTA center shown in FIG. 1.

FIG. 5 shows an example of a functional block diagram of the OTA center 1 shown in FIG. 1. As shown in FIG. 5, the OTA center 1 includes a storage unit 26, a communication unit 27, and a control unit 28. The communication unit 27 and the control unit 28 are implemented by the CPU 21 in FIG. 2 executing a program stored in the storage device 23 by using the RAM 22. The storage unit 26 is implemented by the storage device 23 shown in FIG. 2.

Figure 6:
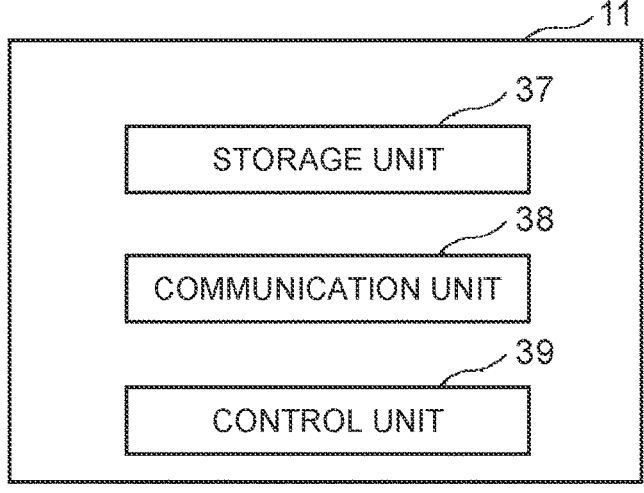
FIG. 6 is a functional block diagram showing an example of the OTA master shown in FIG. 1.

FIG. 6 shows an example of a functional block diagram of the OTA master 11 shown in FIG. 1. As shown in FIG. 6, the OTA master 11 includes a storage unit 37, a communication unit 38, and a control unit 39. The communication unit 38 and the control unit 39 are implemented by the CPU 31 in FIG. 3 executing a program stored in the ROM 33 by using the RAM 32. The storage unit 37 is implemented by the storage device 34 shown in FIG. 3.

Figure 7:
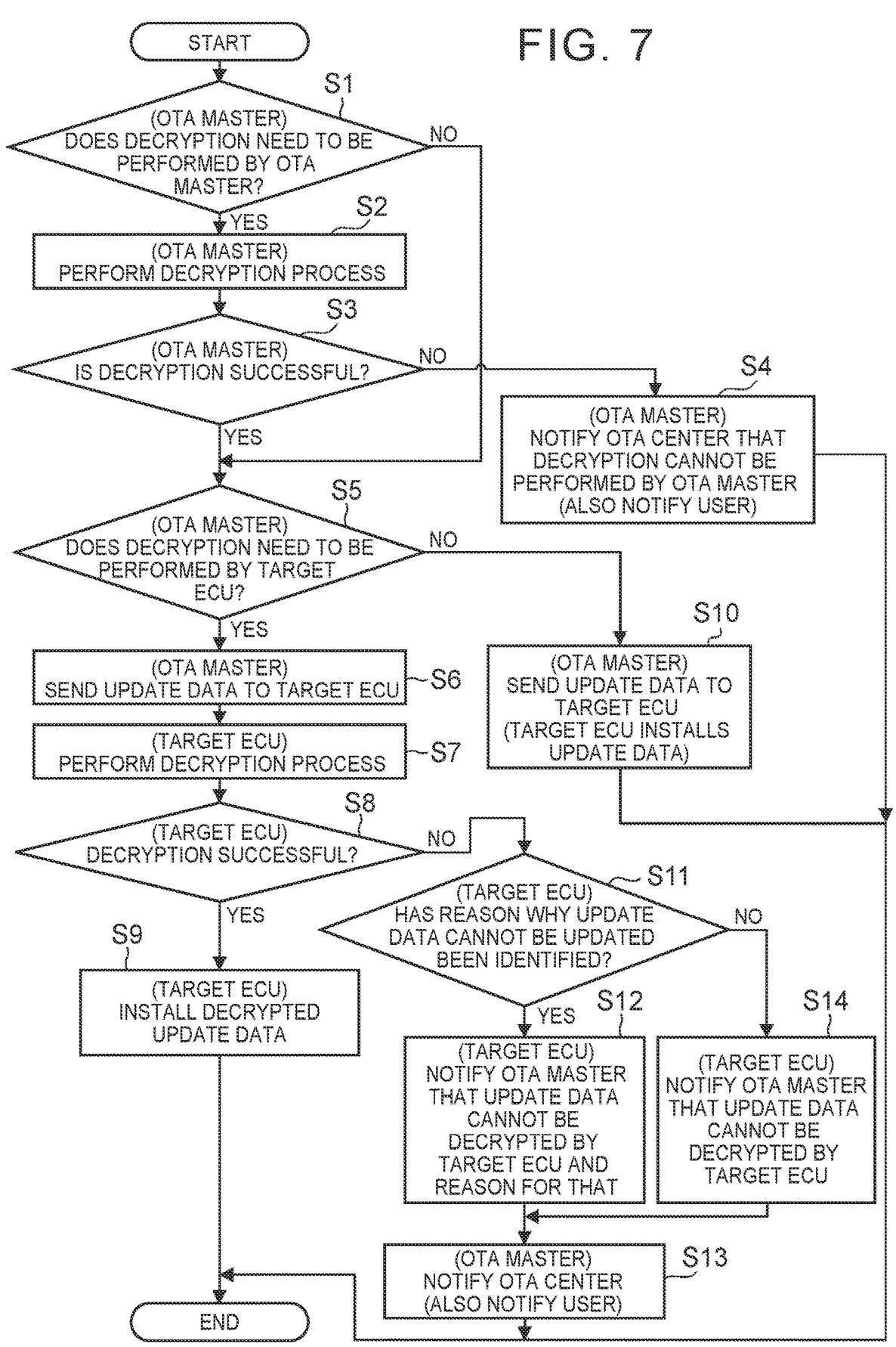
FIG. 7 is a flowchart showing an example of a control process that is performed by the OTA master and each ECU shown in FIG. 1.

FIG. 7 is a flowchart showing an example of a control process that is performed by the OTA master 11 and the ECUs 13a to 13d in the present embodiment. Hereinafter, the control process according to the present embodiment will be described with reference to the flowchart shown in FIG. 7.

The process shown in FIG. 7 is started when the communication unit 38 of the OTA master 11 (see FIG. 6) receives a software distribution package (update data) sent from the OTA center 1 by an OTA campaign and the storage unit 37 stores (i.e., downloads) the received software distribution package. The distribution package is received, for example, in the IG-ON state (the ignition power is ON) and stored in the storage unit 37.

The distribution package that is sent from the OTA center 1 includes information indicating each target ECU whose software is to be updated (and software on each target ECU to be updated), and update data for updating the software on each target ECU. In the distribution package, the update data may have been individually encrypted. For example, in a distribution package including two pieces of update data (first update data for updating software on a first ECU and second update data for updating software on a second ECU), these two pieces of update data may have been individually encrypted. In the distribution package, a plurality of pieces of update data may have been encrypted together. For example, in a distribution package including two pieces of update data (first update data for updating software on a first ECU and second update data for updating software on a second ECU), these two pieces of update data may have been encrypted together as a single encrypted piece of data. In the distribution package, a plurality of pieces of update data may have been individually encrypted as described above, and the individually encrypted pieces of update data may have been encrypted together as described above.

In step S1, the control unit 39 of the OTA master 11 determines whether the update data in the distribution package stored in the storage unit 37 needs to be decrypted by the OTA master 11. For example, the distribution package includes information indicating a device to perform a decryption process, and the control unit 39 of the OTA master 11 makes this determination based on this information. Alternatively, for example, the update data itself includes information indicating a device to perform a decryption process (information that is readable before decryption), and the control unit 39 of the OTA master 11 makes this determination based on this information. When YES in step S1, the routine proceeds to step S2. When NO in step S1, the routine proceeds to step S5.

In step S2, the control unit 39 of the OTA master 11 performs the decryption process on the update data in the distribution package by using key information stored in advance in the storage unit 37. The routine then proceeds to step S3.

In step S3, the control unit 39 of the OTA master 11 determines whether the decryption process performed in step S2 is successful. That is, the control unit 39 of the OTA master 11 determines whether the update data has been successfully decrypted. When YES in step S3, the routine proceeds to step S5. When NO in step S3, the routine proceeds to step S4.

In step S4, the control unit 39 of the OTA master 11 notifies the OTA center 1 that the updated data cannot be decrypted by the OTA master 11 (decryption failed). Specifically, the control unit 39 sends a notification including information indicating the update data that cannot be decrypted and information indicating that the update data cannot be decrypted by the OTA master 11 to the OTA center 1 by using the communication unit 38 (and the communication module 12). In step S4, the control unit 39 of the OTA master 11 also notifies the user that the update data cannot be decrypted etc. For example, the control unit 39 causes the HMI (e.g., a display device of a car navigation system on which an input operation can be performed) 14 to display a message such as "Deciphering of the update software failed. Please contact a distributor." The process shown in FIG. 7 ends thereafter.

In step S5, the control unit 39 of the OTA master 11 determines whether the update data in the distribution package stored in the storage unit 37 needs to be decrypted by the target ECU. For example, the distribution package includes information indicating a device to perform a decryption process, and the control unit 39 of the OTA master 11 makes this determination based on this information. Alternatively, for example, the update data itself includes information indicating a device to perform a decryption process (information that is readable before decryption), and the control unit 39 of the OTA master 11 makes this determination based on this information. When YES in step S5, the routine proceeds to step S6. When NO in step S5, the routine proceeds to step S10.

In step S10, the control unit 39 of the OTA master 11 sends the update data (plaintext update data) to the target ECU. Specifically, the control unit 39 sends the update data (plaintext update data) for which it has been determined in step S5 that decryption by the target ECU is not necessary to the target ECU by using the communication unit 38. The target ECU that has received the update data installs the update data (the update software generated based on the update data) and then activates it. The software update is thus completed. The process shown in FIG. 7 ends thereafter.

In step S6, the control unit 39 of the OTA master 11 sends the update data (ciphertext update data) to the target ECU. Specifically, the control unit 39 sends the update data (ciphertext update data) for which it has been determined in step S5 that decryption by the target ECU is necessary to the target ECU by using the communication unit 38. The routine then proceeds to step S7.

In step S7, the control unit (CPU 41) of the target ECU performs a decryption process on the update data sent from the OTA master 11 in step S6 by using key information stored in advance in the nonvolatile memory 43 (or the storage unit 37 of the OTA master 11). The routine then proceeds to step S8.

In step S8, the control unit (CPU 41) of the target ECU determines whether the decryption process performed in step S7 is successful. That is, the control unit (CPU 41) of the target ECU determines whether the update data has been successfully decrypted. When YES in step S8, the routine proceeds to step S9. When NO in step S8, the routine proceeds to step S11.

In step S9, the control unit (CPU 41) of the target ECU installs the update data (the update software generated based on the update data) decrypted in step S7 in the nonvolatile memory 43 and then activates it. The software update is thus completed. The process shown in FIG. 7 ends thereafter.

In step S11, the control unit (CPU 41) of the target ECU determines whether the reason why the decryption of the update data failed in step S7 has been identified. For example, the control unit (CPU 41) of the target ECU may be able to recognize the encryption method (encryption algorithm) used for the update data to be decrypted, even when the decryption process failed in step S7. Specifically, in the case of the Advanced Encryption Standard (AES) that is a common key encryption method, the control unit (CPU 41) of the target ECU fails in decrypting the update data when the decryption process on the update data encrypted with a common key with a length (number of bits of key information) of 128 bits is performed using a common key with a length of 256 bits to perform. However, for example, the control unit (CPU 41) of the target ECU can recognize that the encryption method used for the update data is the AES when information that can identify the encryption method is included in the update data in such a manner that this information is readable before decryption. In this case, the control unit (CPU 41) of the target ECU considers the key information used for the decryption being different from proper key information to be the reason (cause) for the decryption failure. In this case, the control unit (CPU 41) of the target ECU determines that the reason why the decryption of the update data failed in step S7 has been identified (YES in step S11). When YES in step S11, the routine proceeds to step S12. When NO in step S11, the routine proceeds to step S14.

In step S12, the control unit (CPU 41) of the target ECU notifies the OTA master 11 that the update data cannot be decrypted by the target ECU (the target ECU failed in decrypting the update data) and also notifies the OTA master 11 of the reason why the update data cannot be decrypted. Specifically, the control unit (CPU 41) of the target ECU sends a notification including information indicating the update data that cannot be decrypted, information indicating that the update data cannot be decrypted by this target ECU (itself), and information indicating the reason (cause) why the update data cannot be decrypted to the OTA master 11 by using the communication device 45 The routine then proceeds to step S13.

In step S14, the control unit (CPU 41) of the target ECU notifies the OTA master 11 that the update data cannot be decrypted by the target ECU (the target ECU failed in decrypting the update data). Specifically, the control unit (CPU 41) of the target ECU uses the communication device 45 to send the OTA master 11, a notification including information indicating the update data that cannot be decrypted and information indicating that the target ECU (itself) cannot decrypt the update data. The routine then proceeds to step S13.

In step S13, the control unit 39 of the OTA master 11 uses the communication unit 38 (and the communication module 12) to notify (send) the OTA center 1 of the information received from the target ECU in step S12 or S14. In step S13, the control unit 39 of the OTA master 11 notifies the user that the update data cannot be decrypted. For example, the control unit 39 causes the HMI 14 to display a message such as "Deciphering of the update software failed. Please contact a distributor." The process shown in FIG. 7 ends thereafter.

As described above, in the present embodiment, when decryption of encrypted update data fails, the OTA center 1 is notified that the decryption of the update data fails. The OTA center 1 can therefore recognize that the software update on the target ECU of the vehicle has failed. Accordingly, the OTA center 1 can take appropriate measures (such as resending the update data encrypted with a different cipher to the OTA master 11). For example, the OTA center 1 can check whether the version of the target ECU, the version of the software on the target ECU, the update data sent, etc. are appropriate and can take appropriate measures. For example, when the OTA center 1 determines that the update data sent is not appropriate, the OTA center 1 can resend appropriate update data to the OTA master 11.

As described above, in the present embodiment, when decryption of encrypted update data fails, the OTA center 1 is notified of information indicating the device that has failed in decrypting the update data (OTA master, ECU). The OTA center 1 can thus recognize the device that has failed in performing the software update. This makes it easier for the OTA center 1 to take measures. For example, the OTA center 1 can send another piece of update data only to the device that has failed in performing the software update.

As described above, in the present embodiment, when decryption of encrypted update data fails, the OTA center 1 may be notified of the reason (cause) for the decryption failure. The OTA center 1 can thus recognize the reason (cause) for the decryption failure. This makes it easier for the OTA center 1 to take measures. For example, the OTA center 1 can resend the update data encrypted with a different cipher to the OTA master 11.

As described above, in the present embodiment, when decryption of encrypted update data fails, a predetermined notification (notification that deciphering of the update data has failed, that the user needs to contact a distributor, etc.)

is sent to the user. This can facilitate solution of the problem that the software update cannot be performed due to the decryption failure.

MODIFICATIONS

In the above embodiment, when notifying the OTA center 1 that the OTA master 11 has failed in the decryption process (see S4 in FIG. 7), and when the reason for the decryption failure can be identified, the OTA center 1 may be notified of the identified reason, as in the case where the target ECU has failed in the decryption process (see S11 to S14 in FIG. 7).

The functions of the OTA center 1 illustrated in the above embodiment may be implemented as a management method that is performed by a computer including a processor (CPU), a memory, and a communication device, a management program that is executed by the computer, or a computer readable non-transitory storage medium storing the management program. Similarly, the functions of the OTA master 11 illustrated in the above embodiment may be implemented as a control method that is performed by an in-vehicle computer including a processor (CPU), a memory, and a communication device, a control program that is executed by the in-vehicle computer, or a computer readable non-transitory storage medium storing the control program. The OTA center may include one or more processors. The OTA master may include one or more processors.

The disclosed technique can be used in network systems for updating a program on an electronic control unit (ECU).

What is claimed is:

1. An OTA master configured to control a software update on an ECU mounted on a vehicle, the OTA master comprising:

one or more processors configured to:

download update data of software on the ECU and a distribution package, that includes information indicating a device which needs to perform a decryption process, from an OTA center;

control the software update on the ECU using the update data;

analyze the distribution package to determine, based on a decryption designation field included in the distribution package, whether the decryption process is to be performed by the OTA master or the ECU, wherein the decryption designation field includes information identifying the device, which is to perform the decryption, prior to decryption of the update data;

when the update data has been encrypted and the one or more processors determine that the decryption process needs to be performed by the OTA master, perform the decryption process by using key information stored in the OTA master;

when the update data has been encrypted and the one or more processors determine the decryption process needs to be performed by the ECU, send the update data to the ECU to cause the ECU to perform the decryption process by using key information stored in the ECU;

when the OTA master fails in the decryption process, determine a first reason why the decryption process failed based on information that identifies an encryption method included in the update data, and send a first notification to the OTA center indicating that the OTA master failed the decryption process using the key information stored in the OTA master, wherein the first notification includes information indicating the first reason why the OTA master failed the decryption process; and when the ECU fails in the decryption process, determine a second reason why the decryption process failed based on information that identifies an encryption method included in the update data, and send a second notification to the OTA center indicating that the ECU failed the decryption process using the key information stored in the ECU, wherein the second notification includes information indicating the second reason why the ECU failed the decryption process.

2. The OTA master according to claim 1, wherein the one or more processors are further configured to send a predetermined notification to a user when the decryption process fails.

3. A method that is performed by a computer of an OTA master configured to control a software update on an ECU mounted on a vehicle, the computer including one or more processors and a memory, the method comprising:

downloading update data of software on the ECU and a distribution package, that includes information indicating a device which needs to perform a decryption process, from an OTA center;

controlling the software update on the ECU using the update data;

analyzing the distribution package to determine, based on a decryption designation field included in the distribution package, whether the decryption process is to be performed by the OTA master or the ECU, wherein the decryption designation field includes information identifying the device, which is to perform the decryption, prior to decryption of the update data;

when the update data has been encrypted and the one or more processors determine that the decryption process needs to be performed by the OTA master, performing the decryption process by using key information stored in the OTA master;

when the update data has been encrypted and the one or more processors determine the decryption process needs to be performed by the ECU, sending the update data to the ECU to cause the ECU to perform the decryption process by using key information stored in the ECU;

when the OTA master fails in the decryption process, determining a first reason why the decryption process failed based on information that identifies an encryption method included in the update data, and sending a first notification to the OTA center indicating that the OTA master failed the decryption process using the key information stored in the OTA master, wherein the first notification includes information indicating the first reason why the OTA master failed the decryption process; and when the ECU fails in the decryption process, determining a second reason why the decryption process failed based on information that identifies an encryption method included in the update data, and sending a second notification to the OTA center indicating that the ECU failed the decryption process by using the key information stored in the ECU, wherein the second notification includes information indicating the second reason why the ECU failed the decryption process.

4. A non-transitory storage medium storing instructions that are executable by a computer of an OTA master configure to control a software update on an ECU mounted on a vehicle, and that cause the computer to perform functions, the OTA master including one or more processors and a memory, the functions comprising:

downloading update data of software on the ECU and a distribution package, that includes information indicating a device which needs to perform a decryption process, from an OTA center;

controlling the software update on the ECU using the update data;

analyzing the distribution package to determine, based on a decryption designation field included in the distribution package, whether the decryption process is to be performed by the OTA master or the ECU, wherein the decryption designation field includes information identifying the device, which is to perform the decryption, prior to decryption of the update data;

when the update data has been encrypted and the one or more processors determine that the decryption process needs to be performed by the OTA master, performing the decryption process by using key information stored in the OTA master; and when the update data has been encrypted and the one or more processors determine the decryption process needs to be performed by the ECU, sending the update data to the ECU to cause the ECU to perform the decryption process by using key information stored in the ECU;

when the OTA master fails in the decryption process, determining a first reason why the decryption process failed based on information that identifies an encryption method included in the update data, and sending a first notification to the OTA center indicating that the OTA master failed the decryption process using the key information stored in the OTA master, wherein the first notification includes information indicating the first reason why the OTA master failed the decryption process; and when the ECU fails in the decryption process, determining a second reason why the decryption process failed based on information that identifies an encryption method included in the update data, and sending a second notification to the OTA center indicating that the ECU failed the decryption process by using the key information stored in the ECU, wherein the second notification includes information indicating the second reason why the ECU failed the decryption process.

* * * * *